United States Patent [19]

Taniguchi et al.

[11] Patent Number: 4,702,584
[45] Date of Patent: Oct. 27, 1987

[54] AUTOMATIC FOCUSING CAMERA

[75] Inventors: Nobuyuki Taniguchi, Tondabayashi; Takanobu Omaki, Sennan; Norio Ishikawa, Osaka; Masaaki Nakai, Kawachinagano; Tokuji Ishida, Osaka; Masataka Hamada, Minamikawachi, all of Japan

[73] Assignee: Minolta Camera Kabushiki Kaisha, Osaka, Japan

[21] Appl. No.: 745,305

[22] Filed: Jun. 14, 1985

[30] Foreign Application Priority Data

Jun. 16, 1984 [JP] Japan ............... 59-89673[U]
Jun. 16, 1984 [JP] Japan ............... 59-124168

[51] Int. Cl.$^4$ .............................................. G03B 3/10
[52] U.S. Cl. .................... 354/400; 354/402; 354/195.1
[58] Field of Search ............ 354/400, 409, 486, 195.1, 354/195.11, 195.12, 412

[56] References Cited

U.S. PATENT DOCUMENTS

| 4,247,188 | 1/1981 | Kobori ............... 354/486 |
| 4,289,388 | 9/1981 | Wakabayashi ......... 354/402 |
| 4,295,715 | 10/1981 | Breen ................. 354/486 |
| 4,387,975 | 6/1983 | Araki ................. 354/407 |
| 4,423,935 | 1/1984 | Eguchi et al. ........ 354/402 |
| 4,432,620 | 2/1984 | Kurokawa ............. 354/402 |
| 4,445,761 | 5/1984 | Ishi Kawa et al. .... 354/402 |
| 4,473,743 | 9/1984 | Ishikawa ............. 354/402 |
| 4,538,892 | 9/1985 | Sakai et al. ......... 354/402 |
| 4,542,289 | 9/1985 | Yoko Yama et al. .... 354/402 |
| 4,547,056 | 10/1985 | Baumeister .......... 354/412 |
| 4,550,994 | 11/1985 | Maruyama ............ 354/402 |

Primary Examiner—Russell E. Adams
Attorney, Agent, or Firm—Price, Gess & Ubell

[57] ABSTRACT

In a automatic focussing camera a focusing lens is moved toward the in-focus position while performing a defocus detection while the defocus amount of the photographic lens is large so as to repeatedly judge the error of the position of the focusing lens. When the defocus amount is decreased lower than a predetermined value the lens is stopped and further defocus detection is made for effecting an accurate defocus detection. The error of the defocus detection is small partly because the defocus detection is made while the lens is stopped, and partly because the defocus detection is made under such a state that the error is smaller than the predetermined value.

7 Claims, 18 Drawing Figures

Fig. 2a1
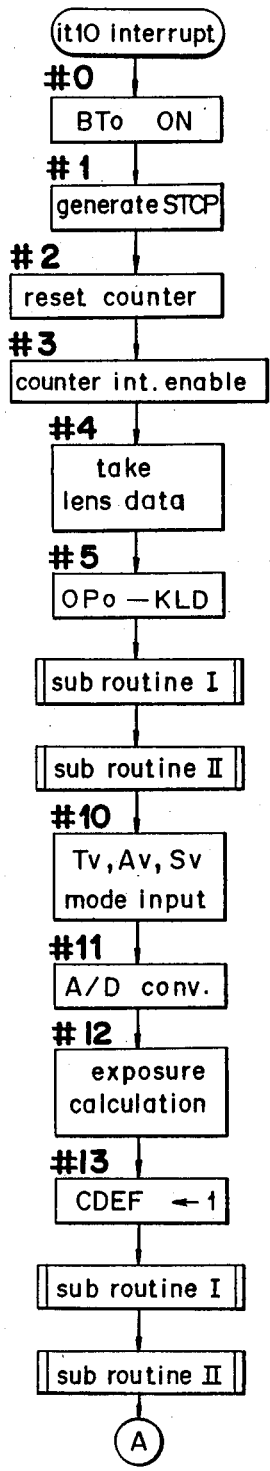

Fig.2a2
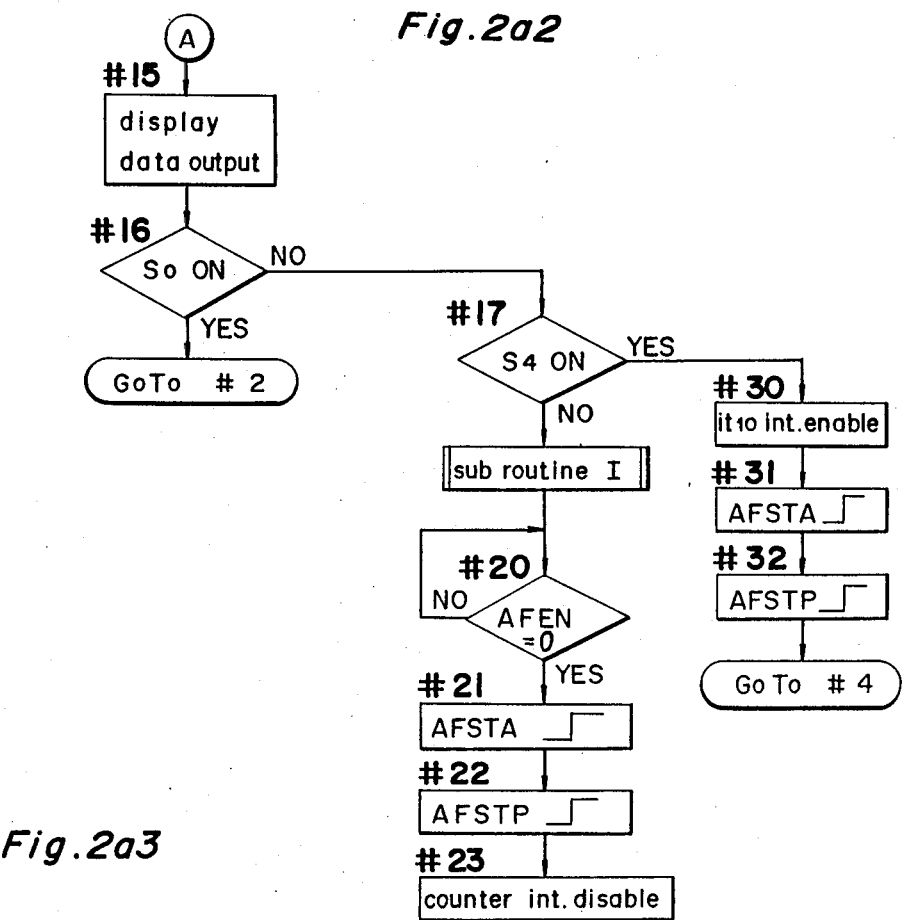
Fig.2a3
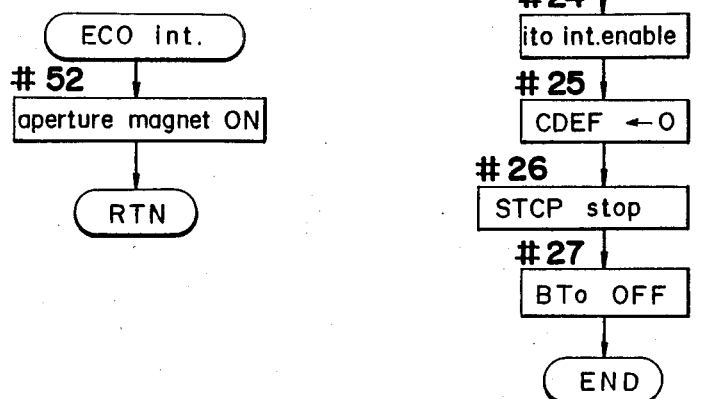

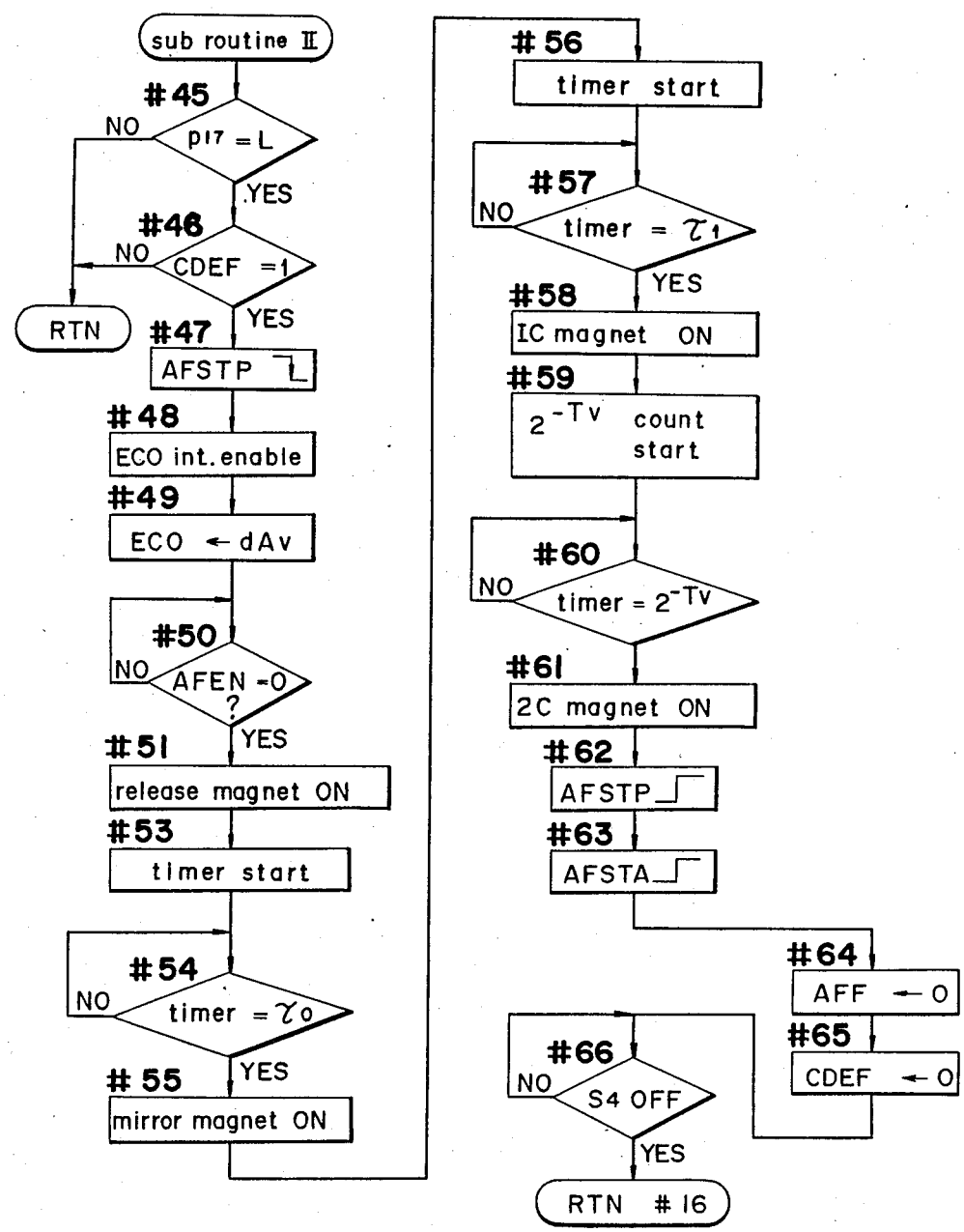
Fig. 2c1

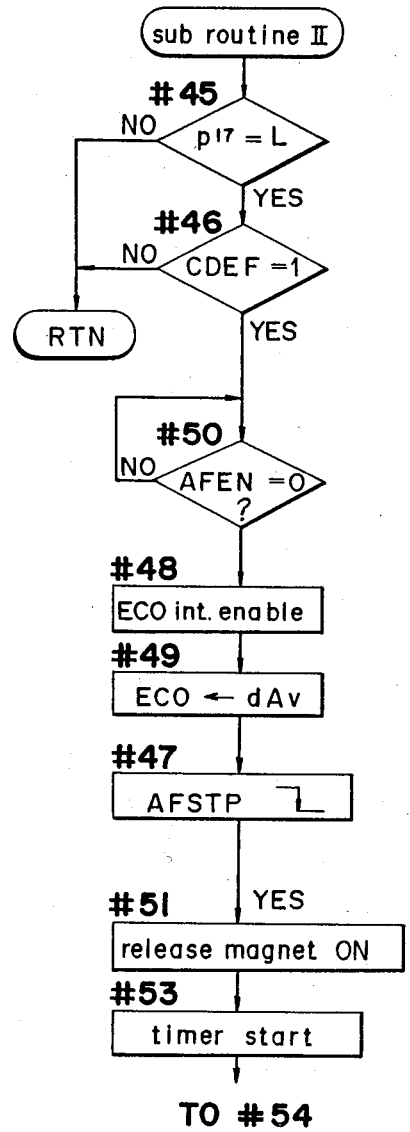
Fig. 2c2

Fig.2g2

Fig. 2g1
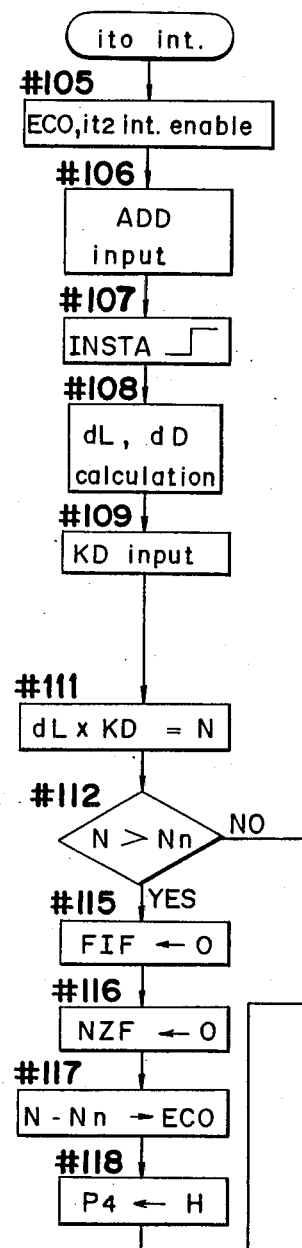
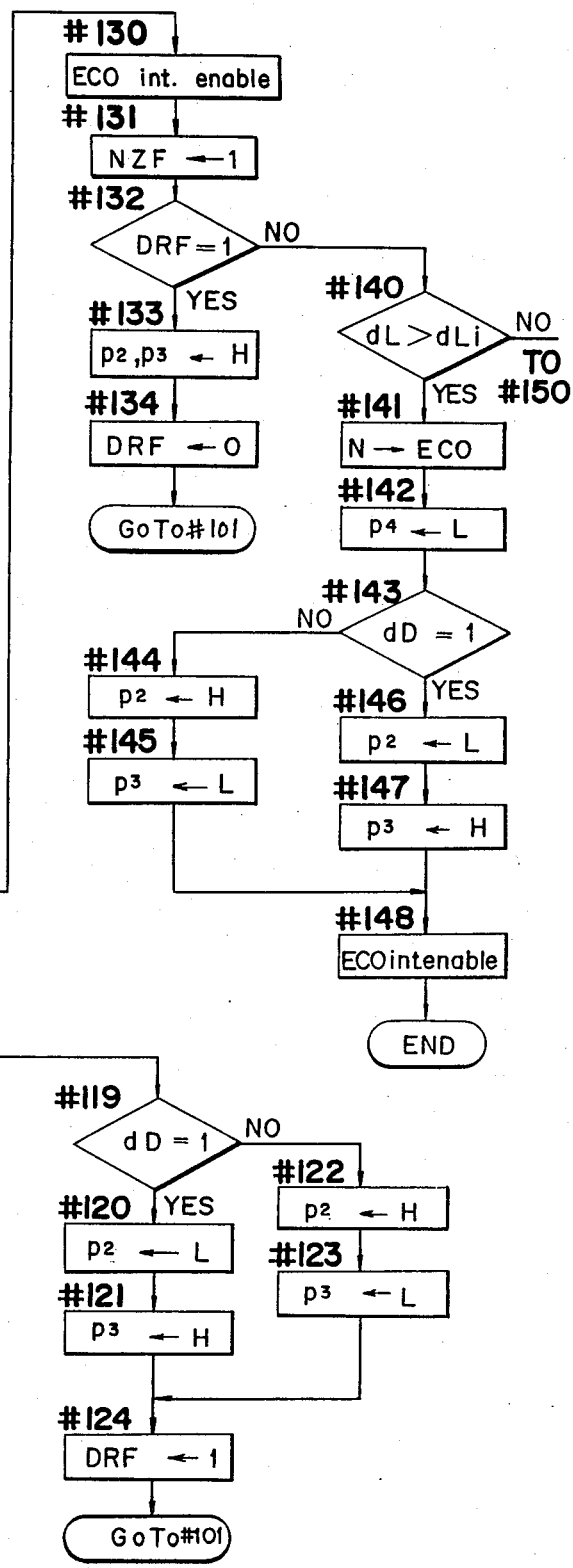

AUTOMATIC FOCUSING CAMERA

BACKGROUND OF THE INVENTION

1. Field of the Invention

The present invention relates to an automatic focusing camera.

2. Description of the Prior Art

There have been proposed automatic focusing devices of the type comprising light which has receiving means for receiving light passed a photographic lens and the amount and direction of defocus of the photographic lens relative to a predetermined focal plane of the photographic lens are detected by the output value of the light receiving means, whereby the photographic lens can be moved to the in-focus position by the result of the detection. In such an automatic focusing device, if accuracy of the light receiving means and control accuracy of positioning of the photographic lens are complete, the photographic lens may be positioned at a desired position by the result of one operation of the defocus detection device. However, actually, the accuracy of the defocus detection is not complete, in particular, in a case where the defocus value is large, the error of the defocus detection is large.

Thus, there may be conceived such an arrangement that the photographic lens is moved toward the in-focus position based on the result of the defocus detection of a first time, then the lens is once stopped, to detect the defocus condition again, subsequently the lens is moved toward the in-focus position based on the result of the second detection. By repeating the above operation, the lens can be positioned at the in-focus position where the defocus value is negligible small. This arrangement, however has a drawback in that the lens is repeatedly moved and stopped, and a smooth automatic lens focusing can not be made. In addition in case of employing a CCD sensor array i.e., charge accumlating device as the light receiving means, since it takes a relatively long charge and discharge time and calculation time of the defocus, whereby a rapid automatic focusing can not be expected.

In order to eliminate the drawbacks mentioned above, U.S. Pat. Nos. 4,387,975 and 4,445,761 disclose automatic focusing devices for correcting the error occurred during charge and discharge of the CCD light sensor array by repeating defocus detection causing the lens to be moved toward the in-focus position. However, such correction of the error during movement of the lens can be possible only when the lens speed is kept constant. On the contrary, in the arrangement shown in U.S. patents, the lens speed may be fluctuated at the beginning of the movement of the lens, accordingly a good accuracy of the correction can not be expected. In addition, according to the arrangement, there is required to provide a memory device for monitoring the amount of movement of the lens, and manufacturing cost becomes expensive, if a microcomputer is employed.

Another arrangement disclosed in Japanese Patent Publication of No. 20322/1978 U.S. Pat. No. 4,247,188 comprises a touch switch which becomes conductive by contact of the finger to a release button of a camera, a light measurement switch which is caused to be conductive by pushing the release button down to a predetermined depth and a release switch which is caused to be conductive by pushing the release button down to a further predetermined depth, whereby light measurement calculation and display are executed when the finger touches the touch switch. When the light measurement switch is conductive, only the above operation is continued. When the release switch is conductive, exposure control is started.

In case of application of the automatic focusing device to the above mentioned arrangement, there occurs a problem of what operating member is used for initiating the automatic focusing device. A first possible arrangement is to use another operating member different from the shutter release button for starting the automatic focusing device. This first arrangement must be provided by said another operating member, whereby operability is bad. A second possible arrangement is to start the automatic focusing upon conduction of the touch switch. However, since the touch switch can be conductive when an electric conductive article touches the touch switch. Therefore, if a foreign article touches with the touch switch inadvertenly, the automatic focusing device inadvertently starts thus, the photographic lens is moved suddenly, surprising the operator. In addition undesired power is consumed. Furthermore, if there is provided with an auxiliary light source in a camera for effecting illumination when focus detection is difficult because of lack of light value as disclosed in Japanese Patent Publication No. 132734/1983, the auxiliary light source is inadvertently illuminated upon touching the shutter release button, surprising the operator and undesired power is consumed.

SUMMARY OF THE INVENTION

An essential object of the present invention is to provide a camera having an automatic focusing device which is able to rapid and accurate automatic focusing.

A further object of the present invention is to provide provide an automatic focusing camera in which an overshooting of the photographic lens during automatic focusing is effectively prevented.

A still further object of the present invention is to provide an automatic focusing camera in which automatic focusing as well as light measurement, exposure calculation and photographing can be made by a simple operation of a single operating member.

For accomplishing the these objects, the photographic lens is moved toward the in-focus position during defocus detection while the defocus amount of the photographic lens is large so as to repeatedly judge the error of the lens. When the defocus value is decreased to an amount lower than a predetermined value the lens is once stopped and defocus detection is made for effecting an accurate defocus detection. The error of the defocus detection is small partly because the defocus detection is made while the lens is stopped, and partly because the defocus detection is made under such a state that the error is smaller than the predetermined value, so that there is generally no need to repeat further defocus detection.

BRIEF DESCRIPTION OF THE DRAWINGS

FIGS. 2a through 2i are respectively flow chart showing the operation of the device shown in FIG. 1, FIGS. 3a and 3b are flow chart showing a modification of the device shown in FIG. 1.

DETAILED DESCRIPTION OF PREFERRED EMBODIMENT

Figure 1A:
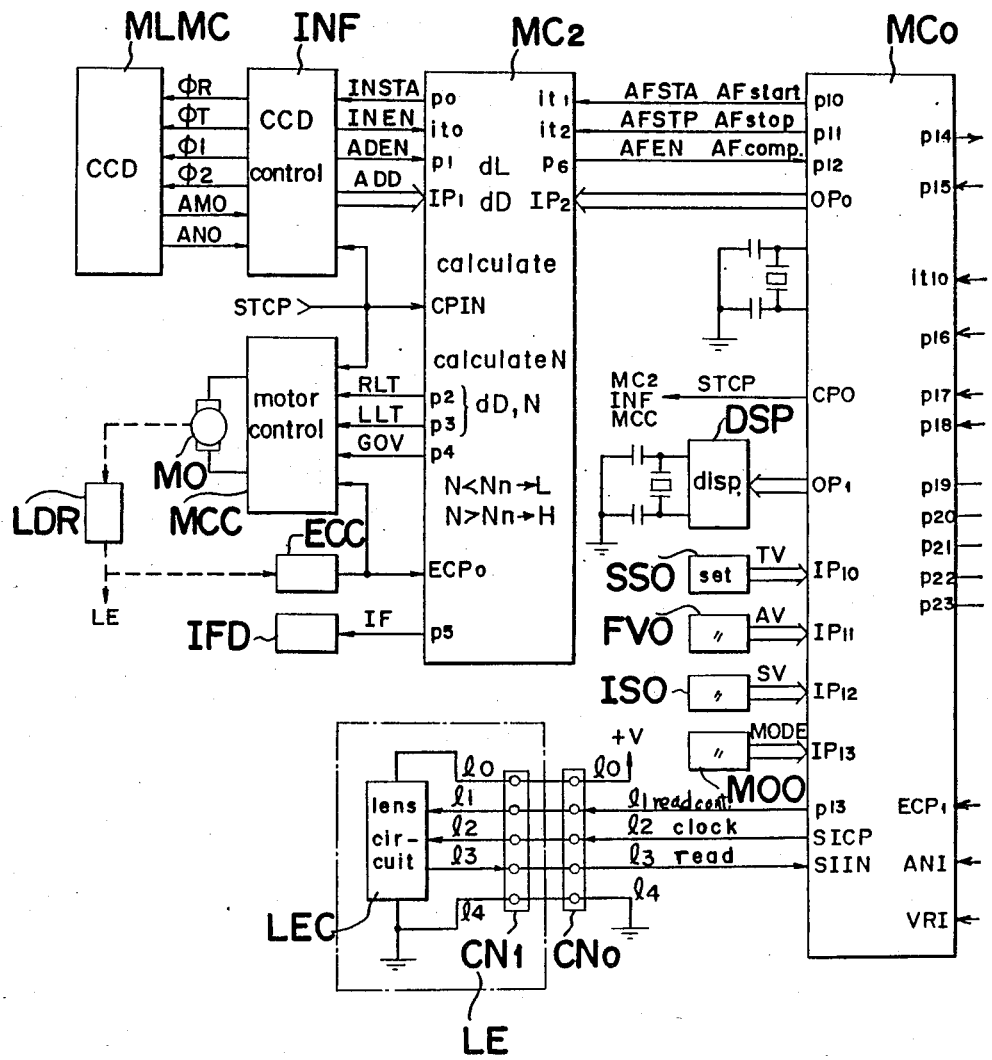
FIG. 1 is comprised of FIGS. 1a and 1b of a schematic block diagram showing one example of a automatic focusing device according to an embodiment of the present invention.
Figure 1B:
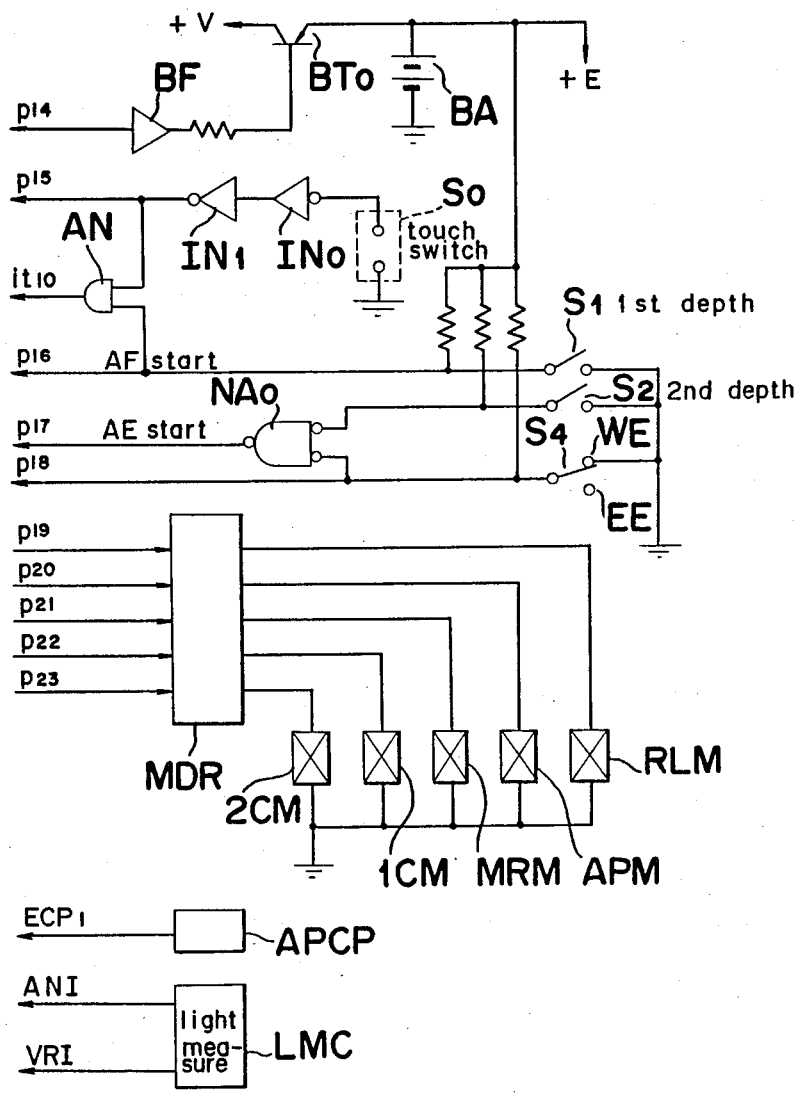

Referring to FIG. 1, a battery BA supplies power source to a micro processors MCO, MC2, a display unit DSP, data output units SSO, FVO, ISO, MOO, a buffer BF, inverters INO, IN1, a magnet drive circuit MDR and a motor control circuit MCC through a line +E. When the terminal p14 of the micro processor MCO becomes Low, a transistor BTO is conducted so that the power source from the battery BA is supplied to a control encoder APCP, a light measurement circuit LMC, a light receiving unit MLMC for the automatic focusing, a control circuit INF of the light receiving unit MLMC, an encoder ECC for counting the amount of rotation of a motor MO for driving photographic optical system a focus display unit IFD and a lens control circuit LEC through a line +V. Said micro processor MCO serves to control the sequential operation of a camera system shown in FIG. 1 and to calculate various data of exposure value. The detail of the operation of the micro processor MCO is shown in FIGS. 2a to 2i which will be described hereinafter.

Figure 4:
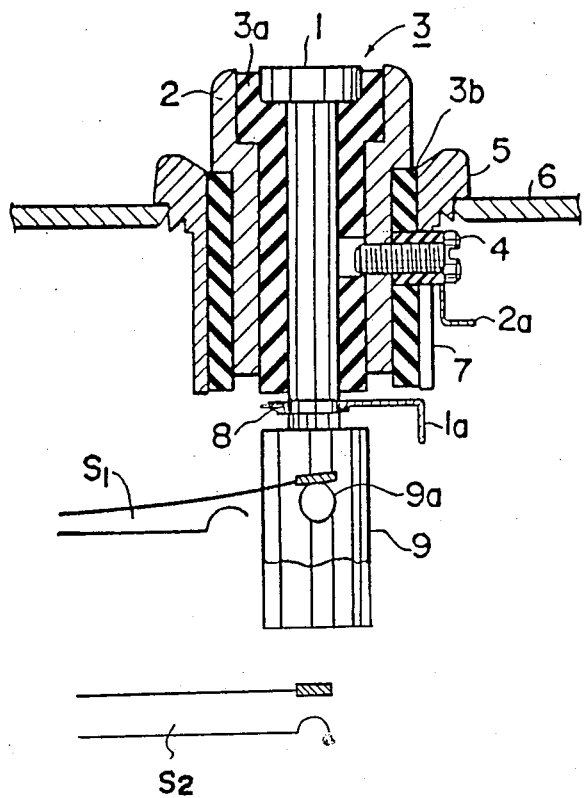
FIG. 4 is a cross-sectional view of the shutter button used in the embodiment of the present invention.

A touch switch SO is conducted when a finger of an operator of the camera touches to a release button shown in FIG. 4 and upon conduction of the touch switch SO, the output of the inverter INO becomes High with the output of the inverter IN1 to be Low. The output of the inverter IN1 is partly input to the terminal p15 and partly input to an interrupt terminal it10 through an and gate AN. The micro processor MCO starts its operation by the negative edge of the signal at the terminal it10.

Si denotes a switch which is closed to be ON upon pressing down of the release button of the camera to the first depth. The ON signal of the switch S1 is input to terminal p16 of the micro processor MCO and the automatic focusing is started.

S2 denotes a switch which is closed to be ON upon pressing down of the release button of the camera to the second depth which is deeper than the first depth. The ON signal of the switch S2 is input to terminal p17 through a nand gate NAO, whereby the micro processor MCO starts an exposure process of the camera.

A switch S4 can be operated to be changed over either toward terminal WE upon completion of winding up of a film and charging of a exposure control mechanism (not shown) or toward terminal EE upon completion of the exposure operation. The signal of the switch S4 is applied to the nand gate NAO so that in case the switch S4 is not in the terminal WE, the ON signal of the switch S1 is stopped by the nand gate NAO, thus, the exposure operation is not started. The signal of the switch S4 is also input to terminal p18 so that the micro processor MCO judges whether or not it is possible to start the exposure operation.

A magnet RLM serves to start the motion of an aperture control member of the camera. The magnet RLM can be driven by a magnet driving circuit MDR for a predetermined time so as to drive in a closing direction of the aperture opening. A magnet APM serves to stop the motion of the aperture control member. The magnet APM can be driven by the magnet driving circuit MDR for a predetermined time so as to cause an engaging member to engage with the aperture control member to stop the aperture closing operation. A magnet MRM serves to lift the reflection mirror of a single lens reflex camera upward. When terminal p21 becomes Low for a predetermined time, the magnet MRM is driven by the magnet drive circuit MDR to disengage a mirror stopping member (not shown), thereby allowing to lift the mirror. A magnet 1CM for driving a first shutter curtain can be excited by the magnet exciting circuit MDR when terminal p22 becomes Low for a predetermined time so that the first shutter curtain is released from an engaged condition by an engaging member and in turn the first shutter curtain starts running to expose a film. A magnet 2CM for driving a second shutter curtain can be excited by the magnet exciting circuit MDR after lapse of time corresponding to the exposure time after starting of the first shutter curtain by a Low output of the terminal p23 for a predetermined time so that the second shutter curtain is released from an engaged condition and in turn the second shutter curtain starts running to interrupt the exposure of the film.

The aperture control encoder APCP generates output pulses the number of which corresponds to the amount of movement of the aperture member. The output pulses of the encoder APCP are fed to an event counter provided in the micro processor MCO through terminal ECP1. The micro processor MCO sets the number of steps of the aperture in the event counter and by enabling the interruption to the micro processor, so that the content of the event counter can be decreased by the pulses fed from the encoder APCP. When the content of the event counter becomes 0 interrupt to the micro processor MCO is enabled. By the interruption, the micro processor MC excites the aperture control magnet APM to stop the aperture so as to control the aperture value at a predetermined value.

The light measurement output obtained from the light measuring circuit LMC is an analog signal input to terminal ANI of the micro processor MCO, thereby being converted into a digital form by an A/D converter provided in the micro processor MCO.

A standard voltage used in the light measuring circuit is input to the terminal VRI of the micro processor MCO so that the standard voltage is used as the reference voltage of the A/D converter.

The display unit DSP is composed of a liquid crystal display device and serves to display the exposure control value and so on in digital form based on the data OP1 fed from the micro processor MCO.

The circuit SSO provides the data of the set exposure time Tv which data is fed to a terminal IP10 of the micro processor MCO.

The circuit FVO provides the data of the set aperture value Av which data is fed to terminal IP11. The circuit ISO provides the data of film sensitivity Sv which is manually set or read from a film container. The data of the circuit ISO is fed to terminal IP12 of the micro processor MCO. The circuit MOO provides the data corresponding to the set exposure control mode which is fed to terminal IP13 of the micro processor MCO.

LE denotes an exchangeable lens having a data output circuit arrangement LEC. When the lens LE is mounted on the camera the lens circuit LEC can be detachably connected with the circuit in the camera shown in FIG. 1 through a connector CNO. A line l0 is used to supply the power source +V to the lens circuit LEC, a line l1 is connected with terminal p13 so that reading the data from the lens circuit is enabled by making terminal p13 high.

A line 12 is connected with terminal SICP of the micro processor MCO and transfers clock pulses of eight bit of 1 byte for inputting the serial data from the lens circuit LEC to the micro processor MCO. The various data provided by the lens circuit LEC can be transferred to the terminal SIIN of the micro processor MCO in series through the line 13 corresponding to the eight clock pulses. The lens circuit LEC comprises a ROM for storing various data of the exchangeable lens in the respective address corresponding to said lens data, address accessing unit for accessing the address of the ROM every time when eight clock pulses are fed to the lens circuit LEC and data output unit for outputting serially various data read from a ROM based on the eight clock pulses. Various data stored in the ROM such as the maximum F-number of the exchangeable lens, minimum F-number, and conversion factor KD for calculating the amount of displacement N of a lens driving means based on the defocus value dL. The conversion factor KD can be output at the output terminal group OPO of the micro processor MCO to the input t erminal group IP2 of the micro processor MC2 in parallel.

The output terminal p10 of the micro processor MCO is coupled with interrupt input terminal it1 of the micro processor MC2 through the line AFSTA so that when the signal on the line AFSTA falls the interruption to the micro processor MC2 is enabled, whereby the micro processor MC2 starts the automatic focusing operation.

The output terminal p11 of the micro processor MCO is connected with the interrupt input terminal it2 of the micro processor MC2 through a line AFSTP and when the signal on the line AFSTP falls to Low, the interruption of the micro processor MC2 is enabled and the automatic focusing control is stopped.

The input terminal p12 of the micro processor MCO is connected to the output terminal p6 of the micro processor MC2 through a line AFEN which is made High during execution of the automatic focusing and is made Low when the automatic focusing is completed. The micro processor MCO judges the completion of the automatic focusing by the Low level of the line AFEN.

The clock output terminal CPO of the micro processor MCO provides standard clock pulses STOP which are fed to the light receiving control circuit INF, motor control circuit MCC and input terminal CPIN of the micro processor MC2.

The light receiving unit MLMC is composed of a charge coupled device (referred to as CCD) having a plurality of fine light sensors lined up in a row. Each of the light sensors is adapted to receive light from the different light projecting points of the photographic lens through a relay optical system disposed between the light receiving unit MLMC and the photographic lens. Such optical system is know to the public as shown in Japanese Patent Laid Open No. 159259/1979 or Japanese Patent Laid Open No. 88709/1983 and therefore, the description of the details thereof is herein omitted.

The light receiving control circuit INF starts its operation upon receipt of the negative edge of the signal on the line INSTA coupled to the terminal po of the micro processor MC2. The operation of the light receiving control circuit INF is described below. When the terminal $\phi R$ is changed to High from Low, the light receiving input MLMC starts to charge the output charge of the respective CCD elements. When the amount of monitor output AMO of the charge in the CCD comes to a predetermined value, a pulse is generated at the terminal $\phi T$ of the CCD control circuit INF, so that the stored charge is transferred to a transferring gate (not shown), causing a line INEN connected to the interrupt input it0 of the micro processor MC2 to be Low. Upon receipt of the low signal, the micro processor MC2 starts to take the data of the stored charge of the light receiving unit MLMC.

The micro processor MC2 calculates the defocus value dL and defocus direction dD defined by the distance and direction between the image forming position of the photographic lens and the predetermined focal plane. The details of the calculation is disclosed in Japanese Laid Open Nos. 45510/1982, 106509/1983 and 80607/1983. Subsequently, the rotation value N and the direction of the motor MO can be defined based on the defocus value dL the direction dD and the factor KD.

Terminals p2 and p3 are provided for controlling the direction of the rotation of the motor MO. When the terminal p2 becomes Low, the motor MO rotates in a clockwise direction and when the teriminal p3 beocmes Low, the motor rotates in a counter clokwise direction. Said motor MO is disposed in the camera and the rotation thereof can be transferred to a lens moving mechanism LDR having a slip system and the focusing mechanism (not shown) is driven so as to displace the focusing optical system included in the photographic lens toward the in-focus position. While the rotation of the lens moving mechanism is transferred to the encoder ECC which generates a number of pulses representing the amount of displacement of the lens moving mechanism.

The motor control circuit MCC causes the motor MO to rotate in any one of the directions corresponding to the states of the terminal p2 and p3 without braking when the terminal p4 is High. In a case where the calculated rotation speed is lower than a predetermined critical speed Nn the terminal p4 is made Low, the motor MO is interruptedly driven with a low speed so that the pulse width of the encoder ECC is kept constant,comparing the width of the output pulse of the encoder ECC with the pulse width of the standard clock pulse STOP.

The critical speed Nn is so defined that the photographic lens is in position where the defocus can be sensed with a high accuracy near the in-focus position and the lens can be stopped in position without overshooting beyond the in-focus positon even if the motor MO is driven with a high speed and then directly stopped. Such region is referred to as the near focused region.

The motor control circuit MCC is so arranged as to brake the motor MO when the terminals p2 or p3 are made High, then the motor is stopped. The details of the control circuit MCC as mentioned above is disclosed in Japanese Patent Laid Open No. 26709/1985.

A focus display unit IFD is so arranged as to effect an indication such as a light emitting diode or buzzer when focusing of the photographic lens is completed with a High signal at the terminal p5 of the micro processor MC2.

Detailed operation of the circuit arrangement as mentioned above will be described hereinafter with reference to the flow chart shown in FIGS. 2a through 2g.

Referring to FIGS. 2a1 and 2a1 showing the flow chart of the operation of the micro processor MCO, with conduction of the switch SO when the finger of the operator touches thereto, the micro processor MCO starts the operation at the stop #0, wherein the terminal p14 is made Low, causing the transistor BTO to be conductive through the buffer to supply the power to the aperture control encoder APCP, light measurement circuit LMC, light receiving unit MLMC, light receiving control circuit INF, encoder ECC, focus display unit IFD and lens circuit LEC through the line +V. The standard clock pulse STOP is generated in the step #1. In the step #2, a counter acting as a timer for counting the time to continue the operation of the light measurement, calculation, display after the switch SO is made OFF is reset and the program flow goes to the step #3 wherein a counter interruption is enabled. In the step #4, subroutine is enabled. In the sub routine, the terminal p13 is made High for enabling the lens circuit LEC and serial input/output circuit in the micro processor MCO by a serial input/output order. The eight clock pulses are generated through the line l2 and the lens circuit LEC sends the first one byte of the lens data in response to the positive edge of the clock pulses to the terminal SIIN of the micro processor in a bit by bit manner through the line l3, whereby the micro processor MCO reads the lens data bit by bit in response to the negative edge of the clock pulse. When the eight clock pulses are output, the eight bit lens data are transferred to a resistor in the micro processor MCO. The operation moves to the next serial input/output order to read the next data and in turn transfers the data to the next register. By repeating the operation mentioned above a plurality of times corresponding to the number of the kinds of the lens data stored in the memory of the lens circuit LEC so as to take all the data in the registers in the micro processor MCO, thereby causing the terminal p13 to be Low and the program flow goes to the step #5. In the step #5, the conversion data KD taken from the lens circuit LEC is transferred to the input terminal OPO of the micro processor MC2.

Figure 2B:
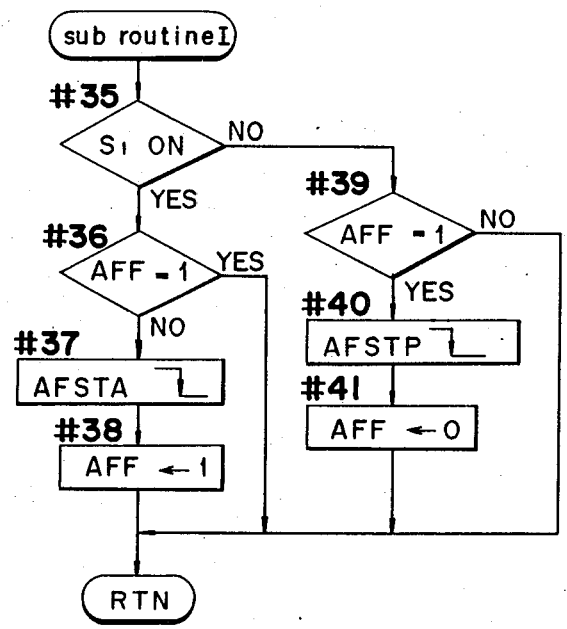

The micro processor MCO execute the subroutine I shown in FIG. 2b, wherein in the step #35, it is judged whether or not the light measurement switch S1 is made ON. With ON of the switch S1, the program flow goes to the step #36 to judge whether or not the flag AFF which shows the performance of the automatic focusing is 1. With 1 of the flag AFF, the program flow goes to the subroutine II shown in FIG. 2c1 since the automatic focusing is presently performed. With 0 of the flag AFF in the step #36, the program flow goes to the step #37, wherein the signal of the terminal p10 and the line AFSTA is fallen so as to cause the micro processor MC2 to be enabled, making the flag AFF 1 in the step #38, then the program flow goes to the sub routine II shown in FIG. 2c. If it is detected in the step 3#5 that the light measurement switch S1 is OFF, the program flow goes to the step #39 to judge whether or not the flag AFF is 1. With 1 of the flag AFF, which shows that the light measurement switch S1 is opened during automatic focusing, the program flow goes to the step #40 to fall the signal on the terminal p11 and the line AFSTP Low so as to stop the automatic focusing by the micro processor MC2, causing the flag AFF to be 0 in the step #41 and the program flow goes to the sub routine II. With 0 of the flag AFF in the step #39, since the automatic focusing is not performed, the program flow goes to the sub routine II directly. In the system as mentioned above, when the touch switch SO is made ON, only the light measurement, calculation and display can be performed, in turn when the light measurement switch S1 is made ON due to pressing down of the release button to the first depth, the automatic focusing can be performed. If the light measurement switch S1 is opened with the touch switch SO kept ON, the automatic focusing can be stopped immediately.

Figure 2E:
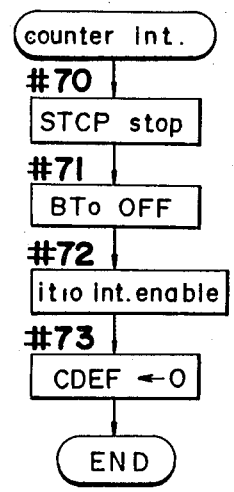
Figure 2D:
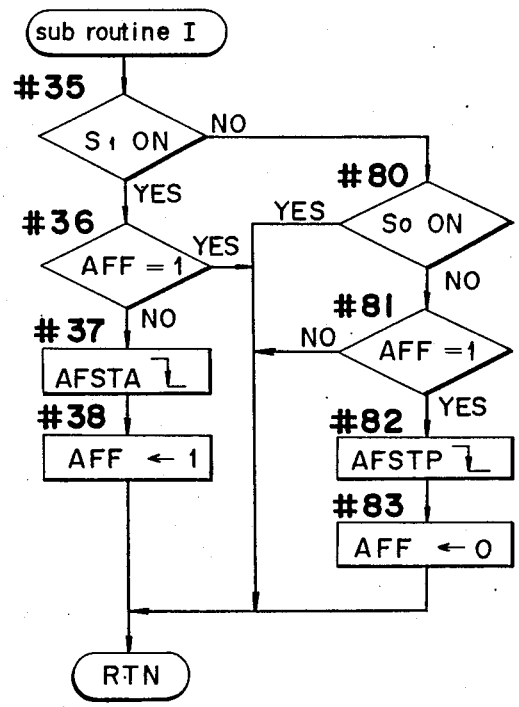

One modification of the operation of the sub routine I is shown in FIG. 2d, wherein if it is detected in the step #35, that the light measurement switch S1 is opened, it is judged whether or not the touch switch SO is ON. With ON of SO, the automatic focusing is continued and the program flow goes to the main routine. With OFF of the touch switch SO, the flag AFF is judged in the step #81. With 0 of the flag AFF which means that the automatic focusing is not performed, the program flow goes to the main routine, while with 1 of the flag AFF which means the automatic focusing is performed, the micro processor MCO causes the terminal p11 and the line AFSTP to be low in the step #82 thereby stopping the automatic focusing, making the flag AFF 0 in the step #83, then the program flow goes to the main routine. According to this modification, the light measurement, calculation and display are made when the touch switch SO is made ON, subsequently the automatic focusing can be started when the light measurement switch S1 is made ON, and the automatic focusing can be continued even if the light measurement switch S1 is turned off so far as the touch switch SO is ON keeping the light measurement and calculation display continued. When the touch switch SO is turned off, the automatic focusing is stopped.

Referring to FIG. 2c1 showing the sub routine II, in the step #45, it is judged whether the terminal p17 is Low. The terminal p17 is made Low by the condition that the exposure control mechanism is in the charged condition and the reset switch S4 is changed to the terminal WE and the release switch S2 is turned on by depression of the release button to the second depth, whereby the output of the nand gate NAO becomes Low. If the terminal p17 is not Low, the program flow goes to the main routine and if the terminal p17 is Low the program flow goes to the step #46 to judge whether or not a flag CDFF is 1. The flag CDFF is made 1 when the calculation of the exposure control data has been complete and is made 0 if the calculation thereof has not yet been completed. If the flag CDFF is 1 the program flow goes to the step #47 and if the flag CDFF is 0, the program flow goes to the main routine. Detailed operation after the step #47 will be explained later.

Referring to FIG. 2a1 again, in the step #10, the respective set exposure time Tv, aperture value Av, film sensitivity Sv, and the data for the exposure control mode are taken in the micro processor MCO from the data output circuits SSO, FVO, ISO and MOO through the terminals IP10, IP11, IP12 and IP13. The result of the light measurement fed from the light measurement circuit LMC is converted into digital form by the A-D converter provided in the micro processor MCO in the step #11. Through these operation all the necessary data for the exposure calculation can be taken in the micro processor MCO. In the step #12, the exposure calculation is performed based on the data thus taken in. After the exposure calculation is completed, the flag CDEF is set to 1 in the step #13, and the sub routines I and II are executed. Then, the program flow goes to the step #15 shown in FIG. 2a2 unless the terminal p17 is Low, to send the display data to the display unit DSP from the port OP1 and goes to the step #16 to judge whether the terminal p15 is Low. It is noted that the terminal p15 can be Low when the touch switch SO is ON. With a Low state of the terminal p15, the program flow goes back to the step #2, resetting the internal counter and repeats the same operation mentioned above. If the terminal p15 is High, the program flow goes to the step #17 to judge whether the terminal p18 is Low by the closed state of the reset switch S4. If the reset switch S4 is ON, the interruption to the terminal it0 is enabled in the step #30, thereafter the terminals p10 and p11 are made High in the steps #31 and #32 and the program flow goes to the step #4. In this case since the steps #2 and 3 are not performed, the internal counter is not reset so that a time counting by the internal counter is continued. After a suitable time such as 5 sec, a counter interruption shown in FIG. 2e is enabled. In the timer interruption, the standard pulse STCP from the terminal CPO in the step #70 is prohibited, thereafter, causing the transistor BTO to be turned off in the step #71 to interrupt the power supply from the line +V, the interruption at the terminal it0 is enabled in the step #72, making the flag CDEF 0 in the step #73 and the micro processor MCO is stopped.

In the step #17 shown in FIG. 2a2 when it is detected that the reset switch S4 is turned off and the exposure control mechanism is not charged, after the sub routine I is performed, the micro processor MCO is stopped to wait that the terminal p6 and line AFEN become Low. When the line AFEN becomes Low, the lines AFSTA and AFSTP are made High in the steps #21 and #22, the counter interruption is disabled in the step #23, while the interruption at the terminal it10 is enabled in the step #24. Subsequently the flag CDEF is made 0, in the step #25, thereby stopping the standard clock pulse SCTP in the step #26. The transistor BTO is turned off in the step #27 to stop the micro processor MCO.

The exposurre control operation is explained hereinafter. In the step #47 in FIG. 2c1 the signal on the line AFSTP has fallen to Low so as to send a signal to the micro processor MC2 for stopping the automatic focusing operation. In the step #48 the event counter interruption is enabled. Namely the internal counter in the micro processor MCO is decreased by the pulses sent from the aperture control encoder APCP through the terminal ECP1 and when the content thereof becomes 0 the counter generates a request of the event counter interruption. Then the event counter is set by the number of steps dAV for the aperture control and the program flow goes to the step #50 wherein the micro processor MC2 stops the automatic focusing control and waits until the line AFEN is made Low. When the line AFEN is made Low, the terminal p19 is made Low for a predetermined time in the step #51, causing the release magnet MRM to be excited for a predetermined time to start the aperture control. In the step #53, the micro processor MCO counts a time TO. After lapse of the time TO, the terminal p21 is made Low for a predetermined time in the step #55 so as to excite the mirror magnet MRM, whereby the reflection mirror is lifted up and the micro processor MCO starts to count another time T1 in the step #56. During the period of time from the beginning of excitation of the release magnet MRM to the lapse of the time T1, the aperture control of the number of steps dAV can be finished. On the other hand, when the time T1 is lapsed after the mirro magnet MRM is excited, the reflection mirro can be positioned out of the photographic light path. In turn the terminal p22 is made Low for a predetermined time in the step #58 to excite the first curtain magnet ICM, whereby the engagement of the first curtain is released and the first curtain starts running. The micro processor MC starts counting the exposure time $2^{-Tv}$ sec, in the step #60. When the time count is finished, the terminal p23 is made Low in the step #62 for exciting the second curtain magnet 2CM for a predetermined time. Then the second curtain starts running. The micro processor MCO makes the lines AFSTP and AFSTA High in the step #62 and 63, and further making the flags AFF and CDEF 0 in the step #64 and #65, whereby the second curtain completes its running and the reflection mirror is moved down. In the step #66, the micro processor MCO waits until the reset switch S4 is changed to the terminal EE by releasing of the aperture. When the change over of the reset switch S4 to the terminal EE is detected, then the program flow goes to the step #16, whereby if the touch switch SO is turned on, light measurement, calculation and display can be performed. If the touch switch SO is turned off, the micro processor MCO performs the steps #17 to #27 and stops the operation.

Figure 2F:
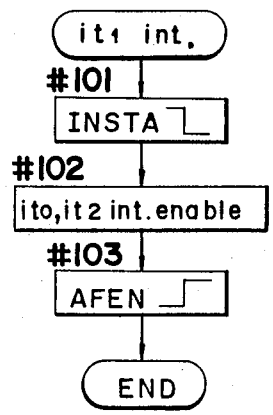
Figure 2F:
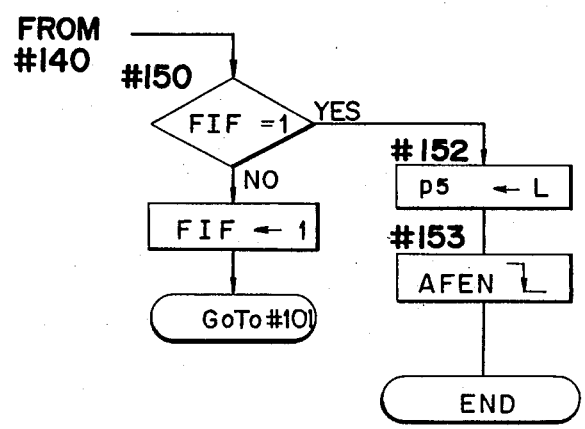

Referring to FIGS. 2f to 2i showing the operation of the micro processor MC2 for automatic focusing control, when the signal on the line AFSTA falls Low, the interruption signal is input to the terminal it1 of the micro processor MC2, which starts from the step #101 shown in FIG. 2f, wherein the signal on the line INSTA is made Low to cause the light receiving control unit INF to be started. With the falling down to Low on the line INSTA, a reset pulse is output at the terminal $\phi R$ to clear off the stored charge in the light receiving unit MLMC, and thereafter begins to start storing of the charge of the output of the light receiving unit. On the other hand, the micro processor MC2 enables interruption at the terminal it0 and it2 in the step #102 and causes terminal p6 and line AFEM to be High in the step #103. The control unit INF waits until the monitor output AMO of the light receiving unit MLMC reaches a predetermined value. When the monitor output AMO reaches the predetermined value, a transferring pulse is produced from a terminal $\phi T$ and the control unit INF provides an interruption signal to the terminal it0 of the micro processor MC2 through the line INEN. In the light receiving unit MLMC, the stored charges are transferred to the transferring gate (not shown) in response to the transfer pulses, and in turn produced from the terminal AMO in response to the pulses $\phi 1$ and $\phi 2$ from the control unit INF. The control unit INF converts the analog signal representing the stored charge from the light receiving unit MLMC into the digital form and when the A-D conversion is completed, the digital data is output to a line ADD, outputting A-D conversion complete signal on a line ADEN.

When the micro processor MC2 receives the interruption signal at the terminal it0, the program flow goes to the step #105 shown in FIG. 2g1 for enabling the event counter interruption and it2 interruption and goes to the step #106. In the step #106, each time the A-D conversion complete signal is fed at the terminal p1, the micro processor MC2 takes the digital data fed to the terminal IP2 therein, storing sequentially in the corresponding register (not shown). When a predetermined number of the data are taken in, the amount of the defocus dL and defocus direction dD are calculated in the step #108 and the conversion factor KD is taken in at the step #109, so that calculation $dL \times KD = N$ is made in the step #111. Thus, the micro processor MC2 provides the number N as the data representing the necessary number of pulses of the encoder ECC, the number of which corresponds to the distance of the displacement of the lens for locating the lens at the in-foucs position from the present defocused position. The number N is referred to as the predetermined displacing amount of the lens. Subsequently, in the step #112, it is judged whether or not the predetermined displacing amount N is greater than the near focusing data Nn and the program flow goes to the step #115 when N is greater than Nn.

In the step #115, a flag FIF is made 0. FIF is the flag which is made 1 when the focusing optical system is located at the in-focus region. Subsequently a flag NZF is made 0 in the step #116. NZF is the flag which is made 1 when the focusing optical system is located at the near focused region. Difference N−Nn is set in the event counter ECO in the step #117 and the terminal p4 is made High in the step #118 for disabling the brake of the motor M0. In the step #119 1 or 0 of the data dD representing the defocus direction is detected and with 1, the program flow goes to the steps #120 and 121 to make the terminal p2 Low for rotation of the motor MO in the clockwise direction and with 0, the program flow goes to the steps #122 and 123 making the terminal p3 Low for rotation of the motor MO in the counter clockwise. In the step #124, the flag DRF is made 1 and the program flow goes to the step #101 shown in FIG. 2f. DRF is the flag which is made 1 when the motor MO is driven. By returning to the step 101, the charge storing operation in the light receiving unit MLMC can be started again so as to make it possible to calculate of the data dD and dL even during operation of the motor for moving the focusing optical system. The operation mentioned above can be repeated until the focusing optical system reaches the in-focus region.

Figure 2I:
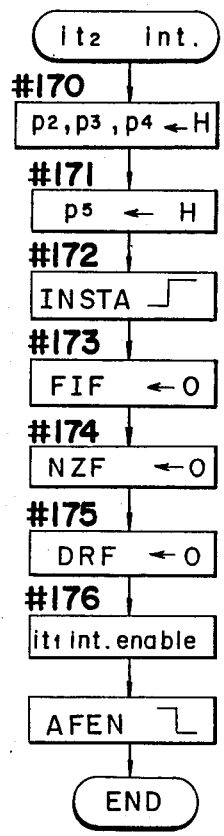
Figure 2H:
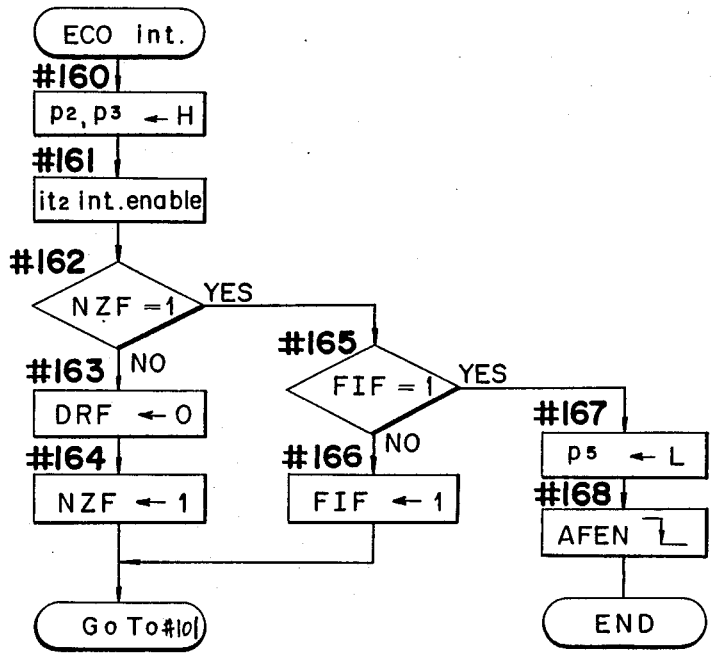

During the operation mentioned above, the content of the event counter ECO can be subtracted by one each time the pulse of the encoder ECC is applied to the event counter and when the content of the event counter ECO becomes 0 and the program flow goes to the step #160 shown in FIG. 2h making the terminals p2 and p3 High to stop the motor MO with the brake thereof effected. Subsequently, interruption to the terminal it2 is enabled in the step #161, the program flow goes to the step #162. If the focusing optical system has not yet reached the near focused region, with the flag NZF 0, the program flow goes to the step #163 to make the flag DRF 0 and NZF 1, returning to the step #101 for causing the charge storing in the light receiving unit MLMC to be started.

In case a position out of the near focused region of the optical system is continued, when it is detected that N is smaller than or equal to Nn in the step #112 shown in FIG. 2g1, the program flow goes to the step #130 to disable the interruption by the event counter ECO making the flag NZF 1 and judges whether or not the flag DRF is 1 in the step #132. In the present case, the motor MO is continued to rotation, the flag DRF is 1 and the program flow goes to the step #133, wherein the terminals p2 and p3 are made High to stop the motor MO with the brake thereof enabled. In the step #134, the flag DRF is made 0, then the program flow goes to the step #101.

Summing up the above operation, when the data N calculated in the encoder is greater than the data of the near focused region Nn, the amount and direction of defocus, the number of pulse of the encoder can be calculated repeatedly. When the calculated number of pulse N becomes smaller than the data Nn of near focused region or interruption due to the movement of the focusing optical system from the event counter is enabled, the motor MO is stopped immediately and the operation moves to the charge storing and calculation under the focusing optical system is stopped.

If it is detected in the step #112 that the number of pulse N from the encoder ECC under such a state that the motor Mo is stopped is smaller than the data Nn of the near focused region, the program flow goes to the step #140 through #130, 131 and 132. In the step #140, it is judged whether the detected defocus amount dL is smaller than the data dLi of the near focused region with dL>dLi, the program flow goes to the step #141 since the focusing optical system is out of the in-focus region. In the step #141, the calculated number N pulse is loaded in the event counter ECO and the terminal p4 is made Low so as to rotate the motor MO at a predetermined speed with the brake enabled in a desired direction defined by the data dD through the steps #143 to 147 then the micro processor MC2 is stopped enabling the event counter interruption in the step #148. By the movement of the focusing optical system with the predetermined value, when the event counter ECO becomes 0, the event counter interruption is made and the program flow goes to the step #160 and the motor MO is stopped enabling the interruption at the terminal 1t2. Since the focusing optical system is in the near focused region and the flag NZF is 1, the program flow goes to the step #65, wherein it is judged whether or not the flag FIF is 0, namely it is judged whether or not the focusing optical system has reached the in-focus region. With 0 of the flag FIF, the flag FIF is set to 1 since it is the first time arrival of the focusing optical system at the in-focus region, then the program flow goes to the step #101 to perform the storing of the charge and calculation in the light receiving unit MLMC for confirmation of the in-focus position of the focusing optical system.

If 1 of the flag FIF is detected, it is assured that the focusing optical system reaches has reached the focused position and the micro processor MC2 make the terminal p5 Low and the display of the in-focus condition is effected by the display unit IFD then the micro processor MC2 stops.

If dL<dLi is detected in the step #140, 1 of the flag FIF is judged in the step #150 shown in FIG. 2g2, If the flag FIF is not 1, it shows the first arrival of the focusing optical system at the in-focus region then the flag FIF is made 1, and the program flow goes to the step #101. If the flag FIF is 1 in the step #150, it is assured that the focusing optical system reaches the focused region and the micro processor MC2 makes the terminal p5 Low and the focus display is effected in the step #152 then the micro processor MC2 stops.

If an interruption signal is applied to the micro processor MC2 through the line AFSTP by placing the signal on the terminal p11 to Low, the program flow goes to the step #170 of FIG. 2i irrespective of the condition of the micro processor MC2. In the step #170, the terminals p2, p3 and p4 are made High to stop the motor MO. The terminal p5 is made High in the step #171 to turn off the focus display. In the step #172, the line INS is made High, so that the flags FIF, NZF and DRF are made 0 through the steps #173 to 175, then the interruption at the terminal it1 is enabled in the step #176, and the terminal p6 is made Low in the step #177, so that completion of the automatic focusing operation is transferred to the micro processor MCO through the line AFEN and the micro processor MC2 is stopped.

Figure 3A:
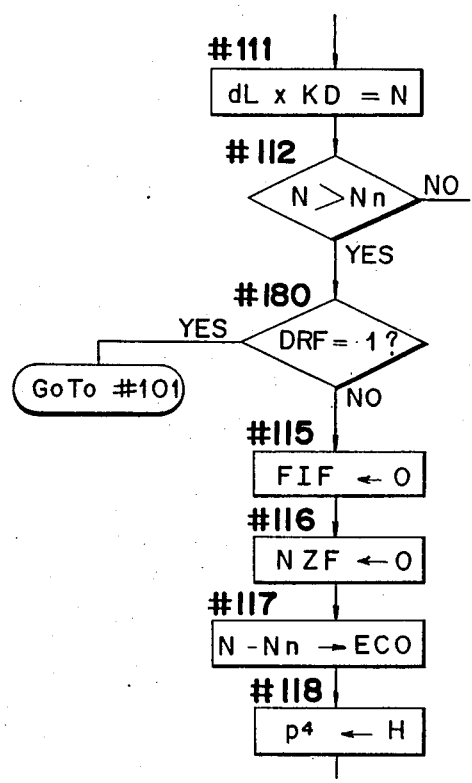
Figure 3B:
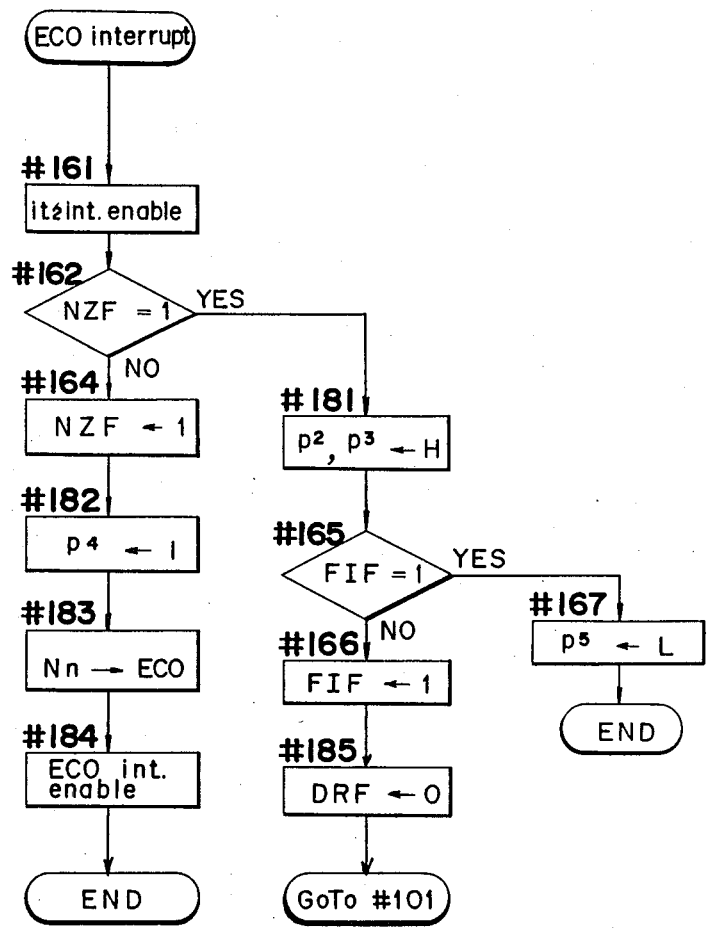

FIGS. 3a and 3b show one modification of the operation of the automatic focusing according to the present invention, wherein while the motor MO is driven, the program flow goes to the step #101 from the step #180 without changing the content of the event counter ECO. If the motor is not driven in the step #180, the calculated data is loaded in the event counter ECO, then the program flow goes to the step #115 to start the motor MO. It is noted that the near focused region is defined in such a distance that the focusing optical system can be stopped at the in-focus position when the motor is subjected to the stop operation with the brake effected. Accordingly, if it is detected that the data N is smaller than Nn and the instruction of the motor is generated during a high speed driving of the motor MO, there may occur an overshooting of the focusing optical system beyond the in-focus position, in this case, the program flow goes to the step #133 through the steps #131 and 132 to brake the motor MO and then returns to the step #101 to perform the light measurement again.

In case the event counter interruption is made, the micro processor MC2 detects whether or not the focusing optical system has been positioned in the near focused region before, and if the focusing optical system has not been in the near focused region, the terminal p4 is made Low in the step #182 so as to drive the motor MO under a low speed and the data Nn is loaded in the event counter ECO, then the micro processor MC2 waits for the event counter interruption which is enabled when the focusing optical system reaches the near focused region. If the event counter interruption occurs once, the motor is braked in the step #181 and the flag FIF is judged. If the flag FIF is not 1, the flag DRF is set 0 and the program flow goes to the step #101 so as to perform the light measurement for confirmation of the focused condition.

Accordingly, in this modification, the automatic focusing operation is made based on the data obtained at the first time of the light measurement but it is repeatedly detected during a high speed drive of the motor MO whether or not there is a possibility of overshooting of the focusing optical system beyond the in-focus position. If there is a possibility of overshoot of the focusing optical system beyond the in-focus position, the focusing optical system is once stopped and the light measurement is made again. It is desired to provide a step after the step #134 for waiting a predetermined time until the photographic optical system is perfectly stopped.

FIG. 4 shows embodiment of the release button according to the present invention. Shown at 3 is a release button and at 6 a camera body. In the embodiment, electrodes 1,2 are positioned in concentric relation, with an insulating bushing 3a interposed therebetween. Electrodes 1,2 and insulating bushing 3a constitutes a release button. The top surfaces of the electrodes 1,2 and insulating bushing 3a are substantially flush with each other, representing the top surface of the release button. When a finger touches this top surface, then electrodes 1,2 are electrically connected by an electrical conductor through the medium of the touching or engaging finger, thus the switch SO shown in FIG. 1 is closed. Shown at 3b is a busing adapted to provide insulation between electrode 2 and the button seat 5. Electrode 1 extends downwards and abuts release shaft 9 made of insulating material at its lower end. Pin 9a radially projecting from release shaft 9 engages a movable arm or piece of switch S1, and thus when button 3 is depressed to a predetermined depth, the switch S1 is closed. When the release button 3 is depressed to a further predetermined depth, the button of the release shaft 9 depresses a contact piece or terminal of a switch S2 to be contacted with the other piece or terminal thereof, thus the switch S2 is closed. A contact piece or terminal 1a is fitted in an annular groove provided in electrode 1 and a washer 8 rigidly secures the contact piece 1a in position. A radially extending screw 4 is threaded in electrode 2 and a contact piece or terminal 2a is secured to screw 4. Shown at 7 is an insulator bushing providing insulation between screw 4 and button seat 5. Lead wires are connected to contact pieces or terminals 1a, 2a so that electrode 1,2 are electrically incorporated in the circuit of FIG. 1.

Although the preferred embodiments of the present invention are fully explained, various modifications may be made by those skilled in the art without departing from the scope of the present invention. For examples, whether or not the focusing optical system is in the near focused region can be detected by comparing a reference defocus amount dLn and the actual defocus amount dL in place of comparing N and Nn. Also the focusing condition can be detected by comparing N and N1 which is the amount of movement corresponding to the optical system.

In a case where the brightness of the object is low, the charging time in the CCD of the light receiving unit may be elongated, whereby before the charge in the CCD is completed the focusing optical system enters in the in-focus position stopping the motor MO and it is required to measure the light value again or a long time is required before this motor is started. For preventing the drawback, it is desired to set a limit on the charging time of the CCD, and when the limit time is elapsed, to take the charge stored in the light receiving unit and to amplify the output of the light receiving unit.

Also, the steps #47 and 50 may be replaced as shown in FIG. 2c2 so as to judge the signal on the line AFEN first.

What is claimed is:
1. An automatic focusing camera comprising:
 (a) a photographic lens,
 (b) means for detecting a defocus amount and a direction of movement of the photographic lens relative to a predetermined focal plane,
 (c) means for driving the photographic lens toward its in-focus position corresponding to the detected defocus amount and direction of the photographic lens,
 (d) means for initially stopping the photographic lens when the photographic lens is moved by the detected defocus amount,
 (e) means for detecting whether the detected defocus amount is within a predetermined value,
 (f) means for repeating the detection of the defocus amount and direction, and
 (g) means for effecting the repetition of the detection of the defocus amount and direction when the detected defocus amount is greater than the predetermined value and moving the photographic lens towards the in-focus position and for stopping the repetition of the defocus detection when the detected defocus amount is smaller than the predetermined value.
2. An automatic focusing camera comprising:
 (a) a photographic lens,

(b) means for detecting a defocus amount and a direction of the photographic lens relative to a predetermined focal plane, (c) means for driving the photographic lens toward its in-focus position corresponding to the detected defocus value and the direction of the photographic lens, (d) first means for stopping the photographic lens when the photographic lens is moved by the detected defocus amount, (e) means for detecting whether the defocus amount is within a predetermined value, (h) means for repeating the detection of the defocus amount and direction during movement of the photographic lens, and (i) second means for stopping the movement of the photographic lens when the detected defocus amount is smaller than the predetermined value and for effecting the detection of the defocus amount and direction and judgement whether the detected defocus amount is smaller than the predetermined value.

3. The automatic focusing camera according to claim 2, wherein said second stopping means further comprises (i1) means for detecting a possibility of overshooting of the movement of the photographic lens over its in-focus position by detecting whether or not the detected defocus value is within a predetermined region, and (i2) means for stopping the photographic lens when said possibility is detected and effecting the detection of the defocus amount.

4. An automatic focusing camera having a release button comprising:

(a) a first switch for generating a first signal when the release button of the camera is touched;

(b) a second switch for generating a second signal when said release button is depressed to a first position;

(c) a third switch for generating a third signal when said release button is depressed to a second position different than the first position;

(d) a first control means for measurement of light of an object to calculate an exposure value based on the result of the light measurement and to display the result of the calculation, (e) a second control means for effecting exposure control based on the result of the calculation, (f) a third control means for effecting automatic focusing of a photographic lens based on the result of the calculation, and (g) system control means for starting the first control means corresponding to the first signal, for starting the third control means corresponding to the second signal and for stopping the third control means and for effecting a starting of the second control means corresponding to the third signal.

5. In an autofocusing system for positioning a lens that can be driven by means for driving the lens to an in-focus position, the improvement comprising:

means for measuring the degree of defocus of the lens position during lens movement;

means for providing a predetermined value wherein the amount of defocus of the lens can be determined with significant accuracy near the in-focus position and without overshooting the in-focus position by the driving means;

means for comparing the measured defocus value with the predetermined value;

means for stopping the lens movement when the measured defocus value corresponds to or is less than the predetermined value;

means for re-measuring the amount of defocus when the lens has been stopped by an appropriate comparison of the comparing means, and means for enabling the picture taking when the re-measured amount of defocus is within a predetermined value.

6. The invention of claim 5 further including means for causing the drive means to move the lens after the re-measurement if the re-measured of defocus is beyond the predetermined value.

7. The invention of claim 6 further including means for moving the drive means at a high speed initially and means for moving the drive means at a predetermined lower speed if the value of the re-measured amount of defocus is greater than the predetermined value when the lens was stopped for a measurement and the lens must accordingly be further moved to the in-focus position.

* * * * *